United States Patent
Thomas et al.

(10) Patent No.: US 10,142,369 B2
(45) Date of Patent: *Nov. 27, 2018

(54) METHOD AND SYSTEM FOR PROCESSING A STREAM OF INFORMATION FROM A COMPUTER NETWORK USING NODE BASED REPUTATION CHARACTERISTICS

(71) Applicant: ThreatMETRIX PTY LTD, Chatswood NSW (AU)

(72) Inventors: Scott Thomas, Rockhampton North (AU); David G. Jones, Crescent Forstville (AU)

(73) Assignee: ThreatMETRIX PTY LTD, Chatswood, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,887

(22) Filed: May 19, 2014

(65) Prior Publication Data
US 2015/0007253 A1 Jan. 1, 2015

Related U.S. Application Data

(63) Continuation of application No. 11/550,393, filed on Oct. 17, 2006, now Pat. No. 8,763,113.
(Continued)

(51) Int. Cl.
*H04L 29/06* (2006.01)
*G06F 17/30* (2006.01)

(52) U.S. Cl.
CPC ........ *H04L 63/20* (2013.01); *G06F 17/30657* (2013.01); *G06F 17/30663* (2013.01);
(Continued)

(58) Field of Classification Search
USPC ...... 726/11, 22, 25; 713/150, 153–155, 189, 713/190
See application file for complete search history.

(56) References Cited

U.S. PATENT DOCUMENTS 6,496,824 B1  12/2002  Wilf
6,714,970 B1   3/2004  Fiveash et al.
(Continued)

OTHER PUBLICATIONS

Evolutionary neural networks for anomaly detection based on the behavior of a program, Han et al, 10.1109/TSMCB.2005.860136, IEEE, (Year: 2005).*

(Continued)

*Primary Examiner* — Jahangir Kabir
(74) *Attorney, Agent, or Firm* — Troutman Sanders LLP; James E. Schutz; Mark Lehi Jones

(57) ABSTRACT

A method for processing information from a variety of submitters, e.g., forensic sources. The method includes receiving information about one or more nodes from a submitter from a plurality of submitters numbered from 1 through N. In a specific embodiment, the one or more nodes are associated respectively with one or more IP addresses on a world-wide network of computers. The method includes identifying a submitter reputation of the submitter from a knowledge base and associating a node reputation of the node based upon at least the reputation of the submitter and submitted information from the submitter. The method also transfers the node reputation.

20 Claims, 14 Drawing Sheets

Related U.S. Application Data

(60) Provisional application No. 60/740,585, filed on Nov. 28, 2005.

(52) U.S. Cl.
CPC .......... *H04L 63/14* (2013.01); *H04L 63/1441* (2013.01); *G06F 2216/03* (2013.01)

(56) References Cited

U.S. PATENT DOCUMENTS

| | | | |
|---|---|---|---|
| 7,177,917 B2 | 2/2007 | Giotta | |
| 7,398,310 B1 | 7/2008 | Kuehl et al. | |
| 7,454,790 B2 | 11/2008 | Potok et al. | |
| 7,461,120 B1 | 12/2008 | Artz, Jr. et al. | |
| 7,533,265 B2 | 5/2009 | Ballinger et al. | |
| 7,545,748 B1 | 6/2009 | Riddle | |
| 7,624,274 B1 | 11/2009 | Alspector et al. | |
| 7,712,134 B1 | 5/2010 | Nucci et al. | |
| 7,908,645 B2 | 3/2011 | Varghese et al. | |
| 7,937,336 B1 | 5/2011 | Maynard-Zhang et al. | |
| 8,095,640 B2* | 1/2012 | Guingo | H04L 41/5009 709/224 |
| 8,132,233 B2 | 3/2012 | Gronholm | |
| 8,141,148 B2 | 3/2012 | Thomas et al. | |
| 8,151,327 B2 | 4/2012 | Eisen et al. | |
| 8,176,178 B2 | 5/2012 | Thomas et al. | |
| 8,706,914 B2* | 4/2014 | Duchesneau | G06F 9/5072 709/203 |
| 8,763,113 B2 | 6/2014 | Thomas et al. | |
| 8,782,783 B2 | 7/2014 | Thomas et al. | |
| 8,844,038 B2 | 9/2014 | Niemela | |
| 8,863,234 B2* | 10/2014 | Zhuk | G06F 21/335 709/206 |
| 9,332,020 B2 | 5/2016 | Thomas et al. | |
| 9,444,835 B2 | 9/2016 | Thomas et al. | |
| 9,444,839 B1 | 9/2016 | Faulkner et al. | |
| 9,449,168 B2 | 9/2016 | Thomas et al. | |
| 2002/0066034 A1 | 5/2002 | Schlossberg et al. | |
| 2002/0138582 A1 | 9/2002 | Chandra et al. | |
| 2003/0140068 A1 | 7/2003 | Yeung | |
| 2003/0174684 A1 | 9/2003 | Pohjanvuori et al. | |
| 2003/0188189 A1 | 10/2003 | Desai et al. | |
| 2003/0223367 A1 | 12/2003 | Shay et al. | |
| 2004/0024867 A1 | 2/2004 | Kjellberg | |
| 2004/0047324 A1 | 3/2004 | Diener | |
| 2004/0098610 A1 | 5/2004 | Hrastar | |
| 2005/0015365 A1 | 1/2005 | Kavacheri et al. | |
| 2005/0076230 A1 | 4/2005 | Redenbaugh et al. | |
| 2005/0081059 A1 | 4/2005 | Bandini | |
| 2005/0187935 A1 | 8/2005 | Kumar | |
| 2005/0210027 A1 | 9/2005 | Aggarwal et al. | |
| 2006/0004837 A1 | 1/2006 | Genovker et al. | |
| 2006/0018466 A1 | 1/2006 | Adelstein et al. | |
| 2006/0064619 A1 | 3/2006 | Wen et al. | |
| 2006/0070128 A1 | 3/2006 | Heimerdinger et al. | |
| 2006/0080657 A1 | 4/2006 | Goodman | |
| 2006/0149708 A1 | 7/2006 | Lavine | |
| 2006/0212942 A1 | 9/2006 | Barford et al. | |
| 2006/0236370 A1 | 10/2006 | John et al. | |
| 2006/0265748 A1 | 11/2006 | Potock et al. | |
| 2007/0011744 A1 | 1/2007 | Carothers et al. | |
| 2007/0124801 A1 | 5/2007 | Thomas et al. | |
| 2007/0214151 A1 | 9/2007 | Thomas et al. | |
| 2008/0022357 A1 | 1/2008 | Agarwal et al. | |
| 2008/0033794 A1 | 2/2008 | Ou et al. | |
| 2008/0034424 A1 | 2/2008 | Overcash et al. | |
| 2008/0047009 A1 | 2/2008 | Overcash et al. | |
| 2008/0066179 A1 | 3/2008 | Liu | |
| 2008/0244744 A1 | 10/2008 | Thomas et al. | |
| 2008/0280592 A1 | 11/2008 | McCown | |
| 2011/0131652 A1 | 6/2011 | Robinson et al. | |
| 2011/0302653 A1 | 12/2011 | Frantz et al. | |
| 2011/0305160 A1 | 12/2011 | Green et al. | |
| 2013/0031042 A1* | 1/2013 | Dehnie | H04L 63/1416 706/47 |
| 2013/0055388 A1 | 2/2013 | Thomas et al. | |
| 2013/0298230 A1* | 11/2013 | Kumar | G06F 21/52 726/22 |
| 2015/0007253 A1 | 1/2015 | Thomas et al. | |
| 2015/0074804 A1 | 3/2015 | Thomas et al. | |
| 2017/0230390 A1 | 8/2017 | Faulkner et al. | |
| 2017/0250983 A1 | 8/2017 | Thomas et al. | |
| 2017/0251004 A1 | 8/2017 | Thomas et al. | |

OTHER PUBLICATIONS

ANNIDS: intrusion detection system based on artificial neural network, Liu et al, 10.1109/ICMLC.2003.1259699, IEEE, 2003 (Year: 2003).*
Non-Final Office Action for U.S. Appl. No. 11/550,393 (dated Oct. 6, 2009) 25 pages.
Final Office Action for U.S. Appl. No. 11/550,393 (dated Jul. 12, 2010) 27 pages.
Non-Final Office Action for U.S. Appl. No. 11/550,393 (dated Mar. 3, 2011) 31 pages.
Final Office Action for U.S. Appl. No. 11/550,393 (dated Aug. 19, 2011) 33 pages.
Non-Final Office Action for U.S. Appl. No. 11/550,393 (dated Apr. 16, 2013) 32 pages.
Notice of Allowance for U.S. Appl. No. 11/550,393 (dated Feb. 13, 2014) 10 pages.
Office Action of U.S. Appl. No. 11/550,395, dated Aug. 27, 2009.
Final Office Action for U.S. Appl. No. 11/550,395, dated Mar. 24, 2010.
Non-Final Office Action for U.S. Appl. No. 11/550,395, dated May 19, 2011.
Notice of Allowance for U.S. Appl. No. 11/550,395, dated Dec. 7, 2011.
Requirement for Restriction/Election for U.S. Appl. No. 12/022,022, dated May 9, 2011.
Notice of Allowance for U.S. Appl. No. 12/022,022, dated Feb. 29, 2012.
Notice of Allowance for U.S. Appl. No. 12/022,022, dated Jan. 9, 2012.
Notice of Allowance for U.S. Appl. No. 12/022,022, dated Feb. 15, 2012.
Final Office Action for U.S. Appl. No. 12/196,256; dated Nov. 13, 2012.
Non-Final Office Action for U.S. Appl. No. 13/372,480 (Jul. 10, 2013).
Notice of Allowance for U.S. Appl. No. 13/372,480 (dated Mar. 6, 2014).
Notice of Allowance for U.S. Appl. No. 13/442,857, dated Apr. 23, 2014.
Advisory Action for U.S. Appl. No. 11/550,393 (dated Oct. 6, 2010).
Advisory Action for U.S. Appl. No. 11/550,393 (dated Dec. 1, 2011).
Advisory Action for U.S. Appl. No. 11/550,395 (dated Sep. 7, 2010).
Non-Final Office Action for U.S. Appl. No. 14/298,823 (dated May 20, 2015).
Notice of Allowance for U.S. Appl. No. 14/298,823 (dated Feb. 3, 2016).
Requirement for Restriction/Election for U.S. Appl. No. 14/455,874, dated Jul. 14, 2015.
Non-Final Office Action for U.S. Appl. No. 14/455,874 (dated Jan. 13, 2016).
Non-Final Office Action for U.S. Appl. No. 12/196,256 (dated Apr. 22, 2011).
Non-Final Office Action for U.S. Appl. No. 12/196,256 (dated Jul. 16, 2013).
Final Office Action for U.S. Appl. No. 12/196,256 (dated Jun. 27, 2014).
Non-Final Office Action for U.S. Appl. No. 12/196,256 (dated Oct. 23, 2014).
Final Office Action for U.S. Appl. No. 12/196,256 (dated Aug. 7, 2015).

(56) References Cited

OTHER PUBLICATIONS

Notice of Allowance for U.S. Appl. No. 12/196,256 (dated Feb. 26, 2016).
Dickerson et al., "Fuzzy Intrusion Detection," IEEE, (2001).
Stone, "CenterTrack: An IP Overlay Network for Tracking DoS Floods," itsec.gov, pp. 1-14, (2000).
Notice of Allowance for U.S. Appl. No. 12/196,256 (dated May 3, 2016).
Notice of Allowance for U.S. Appl. No. 14/298,823 (dated May 19, 2016).
Notice of Allowance for U.S. Appl. No. 14/455,874 (dated May 13, 2016).
U.S. Appl. No. 15/263,113, Non-Final Office Action dated Jun. 14, 2017.
Peacock et al., "Typing Patterns: A Key to User Identification," IEEE Security & Privacy, pp. 40-47, Sep./Oct. 2004.
U.S. Appl. No. 15/237,385, Non-Final Office Action dated Aug. 24, 2017.
U.S. Appl. No. 15/262,884, Requirement for Restriction/Election dated Sep. 5, 2017.
U.S. Appl. No. 15/262,884, Non-Final Office Action dated Feb. 16, 2018.

* cited by examiner

METHOD AND SYSTEM FOR PROCESSING A STREAM OF INFORMATION FROM A COMPUTER NETWORK USING NODE BASED REPUTATION CHARACTERISTICS

CROSS-REFERENCES TO RELATED APPLICATIONS

This application is a continuation application of U.S. patent application Ser. No. 11/550,393, filed Oct. 17, 2006, which claims priority of Provisional Patent Application Ser. No. 60/780,585 filed Nov. 28, 2005, titled "METHOD AND SYSTEM FOR PROCESSING A STREAM OF INFORMATION FROM A COMPUTER NETWORK USING NODE BASED REPUTATION CHARACTERISTICS" by David G. Jones, both applications are commonly owned and incorporated herein by reference in their entirety.

COPYRIGHT NOTICE

All content included such as text, graphics, logos, button icons, images, audio clips, digital downloads, data compilations, and software, is the property of its supplier and protected by United States and international copyright laws. The compilation of all content is protected by U.S. and international copyright laws. Copyright © 2006 ThreatMETRIX PTY LTD. All rights reserved.

BACKGROUND OF THE INVENTION

The present invention generally relates to knowledge based techniques. More particularly, the invention provides a method and system for processing a stream of information in a network computing environment using reputation characteristics associated with one or more nodes provided in a knowledge base. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

Telecommunication techniques have been around for numerous years. In the early days, telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network. These computers or workstations coupled to each other can transmit many types of information from one geographical location to another geographical location. This information can be in the form of voice, video, and data, which have been commonly termed as "multimedia." Information transmitted over the Internet or Internet "traffic" has increased dramatically in recent years. Information is now transmitted through networks, wide-area networks, telephone systems, and the Internet. This results in rapid transfer of information such as computer data, voice or other multimedia information.

Although the telecommunication industry has achieved major successes, certain drawbacks have also grown with wide spread communication networks. As merely an example, negative effects include an actor (initiator) to connect to another actor (acceptor) in a manner not acceptable to the acceptor. The inability for the acceptor to assess the risk of allowing connection from any initiator means is a problem for efficient resource management and protection of assets. Other drawbacks also exist.

As the size and speed of these networks increase, similar growth of malicious events using telecommunications techniques: stalking, cyber-stalking, harassment, hacking, spam, computer-virus outbreaks, Denial of Service attacks, extortion, fraudulent behaviors (e.g., such as fraudulent websites, scams, 419 spam, so-called phishing) have also continued to increase. This increase is largely due to the anonymous methods that can be used over a network to obscure the initiator's identity, location and disposition. These and other limitations are described throughout the present specification and more particularly below.

From the above, it is seen that a technique for improving security over a wide area network is highly desirable.

BRIEF SUMMARY OF THE INVENTION

According to the present invention, techniques related to knowledge bases are provided. More particularly, the invention provides a method and system for processing a stream of information in a network computing environment using reputation characteristics associated with one or more nodes provided in a knowledge base. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

In a specific embodiment, the present invention provides a method for processing information from a variety of submitters, e.g., forensic sources. The method includes receiving information about one or more nodes from a submitter from a plurality of submitters numbered from 1 through N. In a specific embodiment, the one or more nodes are associated respectively with one or more IP addresses on a world wide network of computers. The method includes identifying a submitter reputation of the submitter from a knowledge base and associating a node reputation of the node based upon at least the reputation of the submitter and submitted information from the submitter. The method also transfers the node reputation.

In an alternative specific embodiment, the present invention provides an alternative method for creating a real time knowledge base of a plurality of nodes from a variety of submitters. The method includes receiving first information about one or more nodes from a first submitter from a plurality of submitters numbered from 1 through N. In a preferred embodiment, the one or more nodes are associated respectively with one or more IP addresses on a world wide network of computers. The method identifies a submitter reputation of the first submitter from a knowledge base. The submitter is one of the plurality of submitters numbered from 1 through N. The method includes associating a node reputation of the node based upon at least the reputation of the first submitter and first submitted information from the first submitter and storing the first submitted information in a first portion of the knowledge base. The method also includes repeating the receiving, identifying, associating, and storing for second information from a second submitter.

In a specific embodiment, the present invention provides a system for processing information from a variety of submitters. The system has one or more computer readable memories, which include various computer codes. One or more codes are directed to receiving information about one or more nodes from a submitter from a plurality of submitters numbered from 1 through N. In a specific embodiment, the one or more nodes are associated respectively with one or more IP addresses on a world-wide network of computers. One or more codes are directed to identifying a submitter reputation of the submitter from a knowledge base. One or more codes are directed to associating a node reputation of the node based upon at least the reputation of the submitter and submitted information from the submitter. One or more codes are directed to transferring the node reputation. Depending upon the embodiment, there can be other computer codes that carryout the functionality described herein as well as outside of the present specification.

In an alternative specific embodiment, the present invention provides a method for processing a stream of information to determine a security level. The method includes providing a knowledge base, which has information about a plurality of nodes. Each of the nodes is numbered from 1 through N. Each of the nodes is assigned a reputation characteristic numbered respectively from 1 through N. Each of the reputation characteristics has one or more of a plurality of properties. The method includes identifying a selected node from the plurality of nodes. In a preferred embodiment, the selected node is coupled to a network of computers. The method requests reputation information associated with the selected node through the network of computers. The method derives at least one of the reputation characteristics numbered from 1 through N of the selected node from the knowledge base. The method transfers the reputation characteristic through the network of computers. The method also processes information from a stream of data associated with the selected node within the plurality of nodes using a selection of at least one of a plurality of processes. In a preferred embodiment, the selected process is associated with the reputation characteristic of the selected node.

In a further alternative embodiment, the present invention provides a system for characterizing reputations of one or more nodes in a computer network environment. The system has a knowledge base, which includes information about a plurality of nodes. Each of the nodes is numbered from 1 through N. Each of the nodes is assigned a reputation characteristic numbered respectively from 1 through N. Each of the reputation characteristics has one or more of a plurality of properties. In a specific embodiment, the one or more of the properties is associated with a submitter, which has a submitter reputation characteristic.

As an analogy to the real physical world (in contrast to the computer based virtual world), we often use various forms of verification to assess the reputation of an entity we wish to "connect" with. In the simple example of seeking a good plumber, we often ask friends about their similar experiences. In employing a new staff member, we examine their resume and check their personal and professional references.

In contrast, on a conventional connected network, wide-area network or Internet there is largely an absence of similar assessment methods. In the realm of websites, search engines such as those provided by Google Inc. of Mountain View Calif. 94043 (USA) attempt to elevate the more interesting or relevant websites to the top of the viewers search list, which is limited.

Many benefits are achieved by way of the present invention over conventional techniques. For example, the present technique provides an easy to use process that relies upon conventional computer software and hardware technology. According to a specific embodiment, the present invention provides a system and assessment methods that allow external software applications, services or users to assess risk of a connecting actor. As merely an example, the present invention provides a method and associated computer program that can be used to assign a 'risk' disposition to a specific "actor", such as:

Network or internet node;

User or entity (either human or automated computer program) controlling the behavior of a network or internet node;

A combination of the two above either being controlled directly from the node or from a remote node; and A combination of the two above operating through a proxy device in order to provide anonymity to the actor or to enhance the impact of the actor's 'actions'.

In a specific embodiment, the 'risk' disposition is assigned when the actor attempts to:

Connect to a network device (including host, router, gateway etc);

Connect to a network device and then perform actions; or

Allow packets to traverse a network or internet.

Risk dispositions are provided in a multi-dimensional response to users or devices that may request about this actor. Many if not all "contributors" to system provide information, assertions and evidence ("submissions") about an actor's behavior that are formulated by the system into the 'risk disposition' ("reputation") for the given "action" and temporally when the action is occurring. Any contributor can also be considered an actor. Any submission can be considered to be evidence about the actor or the contributor. Of course, there can be other variations, modifications, and alternatives.

In a specific embodiment, automated protections are central to the present system to modify the reputation of contributors and the impact of their submission based on the quality of their content and the context of the submission. Automated protections also exist for small or large groups of contributors to not corrupt the quality of the system through false or forged submissions or through large volumes of submissions. In a specific embodiment, the present invention can also provide protection from 'spoofing' of a contributor's identity. In a specific embodiment, the system may be implemented on a single computer, a group of computers or in a distributed manner across the network or Internet. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques related to knowledge bases are provided. More particularly, the invention provides a method and system for processing a stream of information in a network computing environment using reputation characteristics associated with one or more nodes provided in a knowledge base. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, any combination of these, and others.

Figure 1:
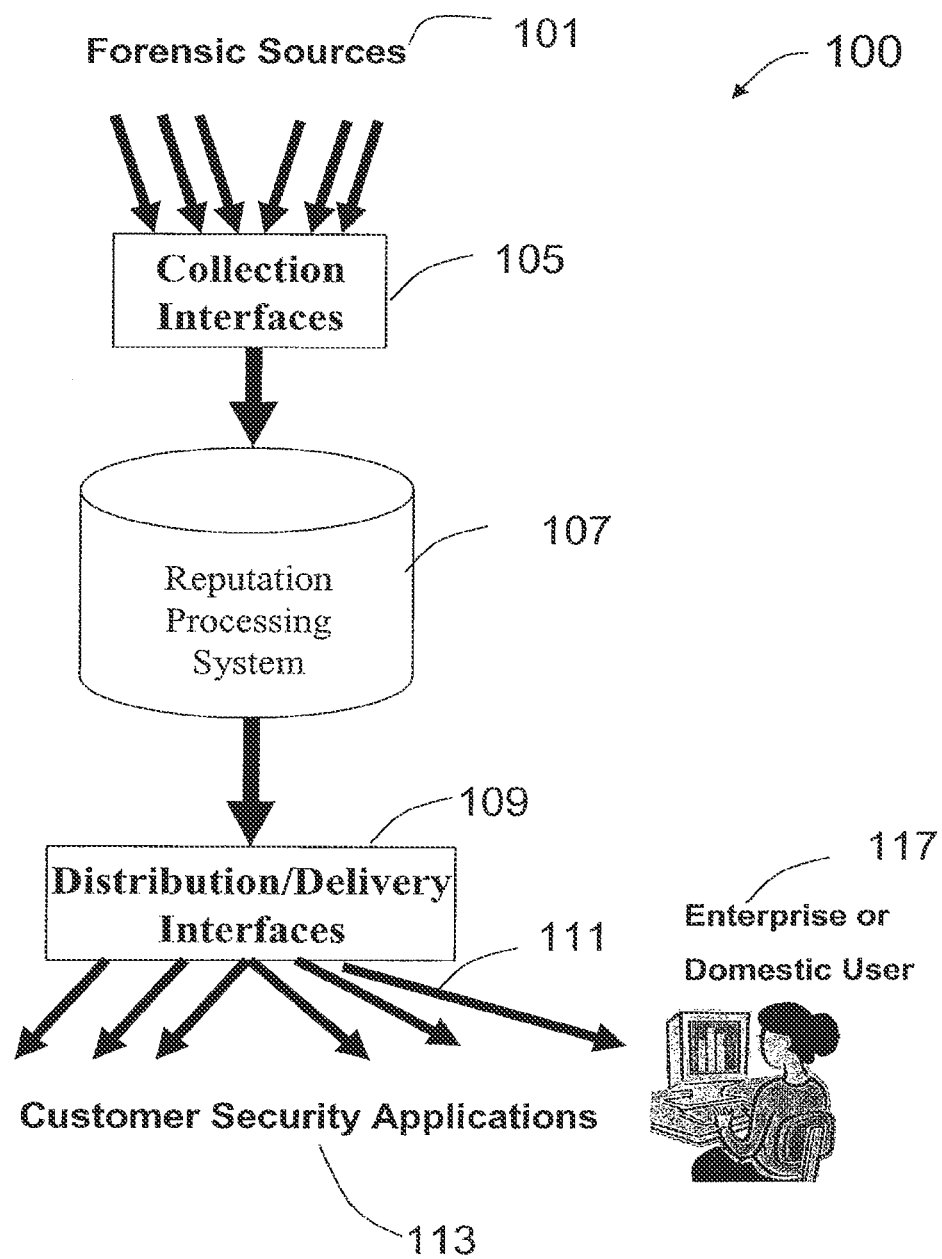
FIG. 1 is a simplified diagram illustrating an overall system according to an embodiment of the present invention.

FIG. 1 is a simplified diagram illustrating an overall system 100 according to an embodiment of the present invention. This diagram is merely an example, which should not unduly limit the scope of the claims herein. One of ordinary skill in the art would recognize other variations, modifications, and alternatives. As shown, the system includes collection interfaces 105, which receive information from a plurality of forensic sources 101. The collection interfaces transfer the information into a reputation processing system 107, which provides the information to distribution/delivery interfaces 109. Such interfaces transfer the information 111 to custom security applications 113 according to a specific embodiment. A user 117 then has access to the information about the source. Further details of the present system can be found throughout the present specification and more particularly below.

Figure 2:
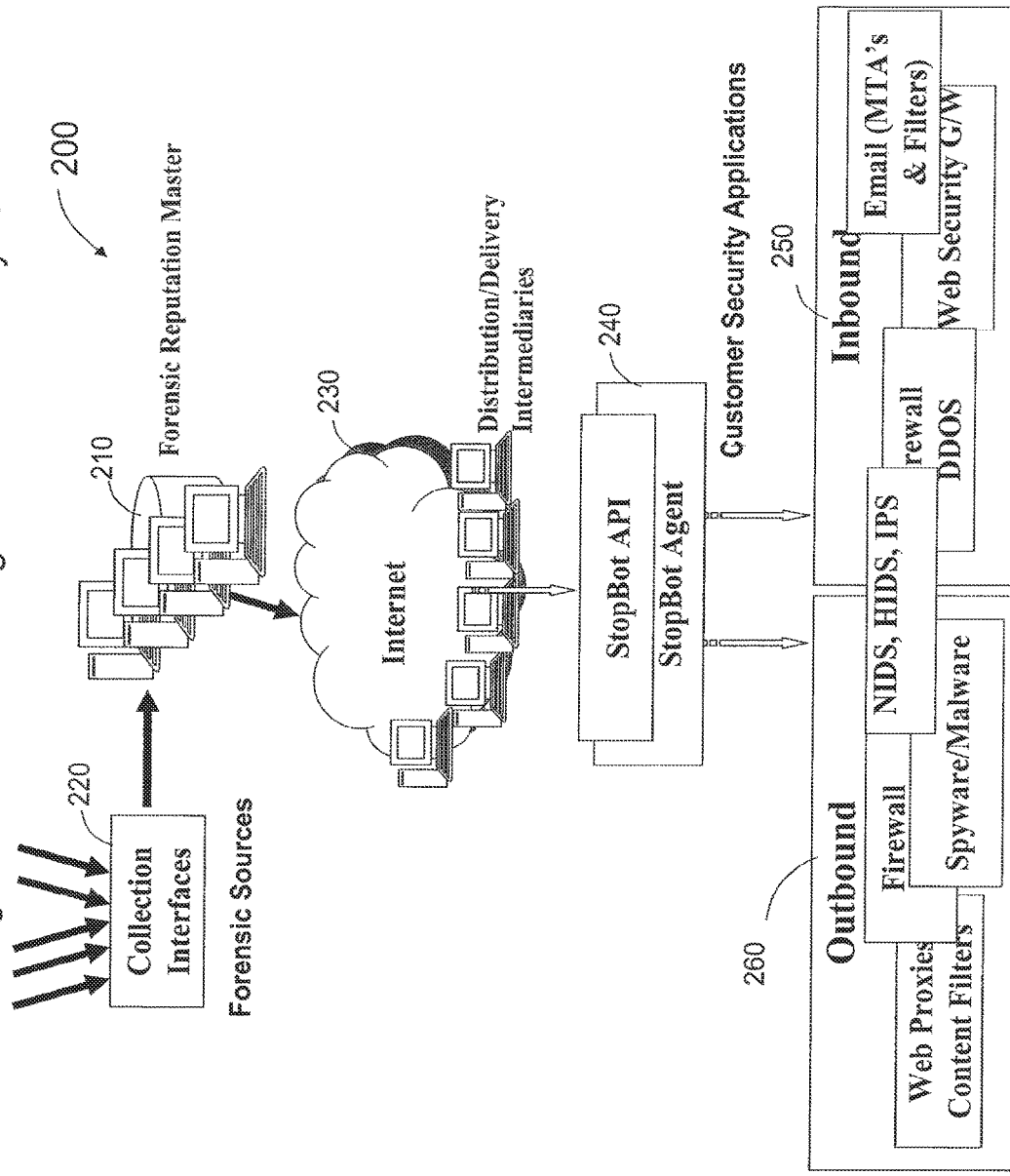
FIG. 2 is a more detailed diagram illustrating an overall system according to an embodiment of the present invention.

FIG. 2 is a more detailed diagram illustrating an overall system 200 according to an embodiment of the present invention. This diagram is merely an example, which should not unduly limit the scope of the claims herein. One of ordinary skill in the art would recognize other variations, modifications, and alternatives. As shown, in a specific embodiment, the overall system 200 includes a forensic reputation master 210, which is coupled to a forensic information collecting interface 220. Forensic reputation master 210 is coupled to the Internet 230. Security service providers 240, such as StopBot API or StopBot Agent, are coupled to the Internet. In this application, StopBot refers to a trademark name for a reputation system provided by Threat-MEMTRIX PTY. LTD. Inbound customer security applications 250 and outbound customer security applications 260 are coupled to security service providers 240. Further details of the present system can be found throughout the present specification and more particularly below.

A method for creating a real time knowledge base of a plurality of nodes from a variety of submitters is briefly outlined below.

1. Receive first information about one or more nodes from a first submitter from a plurality of submitters numbered from 1 through N;
2. Identify a submitter reputation, which is one of the plurality of submitters numbered from 1 through N, of the first submitter from a knowledge base;
3. Associate a node reputation of the node based upon at least the reputation of the first submitter and first submitted information from the first submitter;
4. Store the first submitted information in a first portion of the knowledge base;
5. Repeat the steps of receiving, identifying, associating, and storing for second information from a second submitter;
6. Continue one or more of the above steps to populate the knowledge base; and
7. Perform other steps, as desired.

The above sequence of steps provides a method according to an embodiment of the present invention. In a specific embodiment, the present invention provides a method for populating a knowledge base using reputation information. Other alternatives can also be provided where steps are added, one or more steps are removed, or one or more steps are provided in a different sequence without departing from the scope of the claims herein. Details of the present method and structure can be found throughout the present specification and more particularly below.

Figure 3:
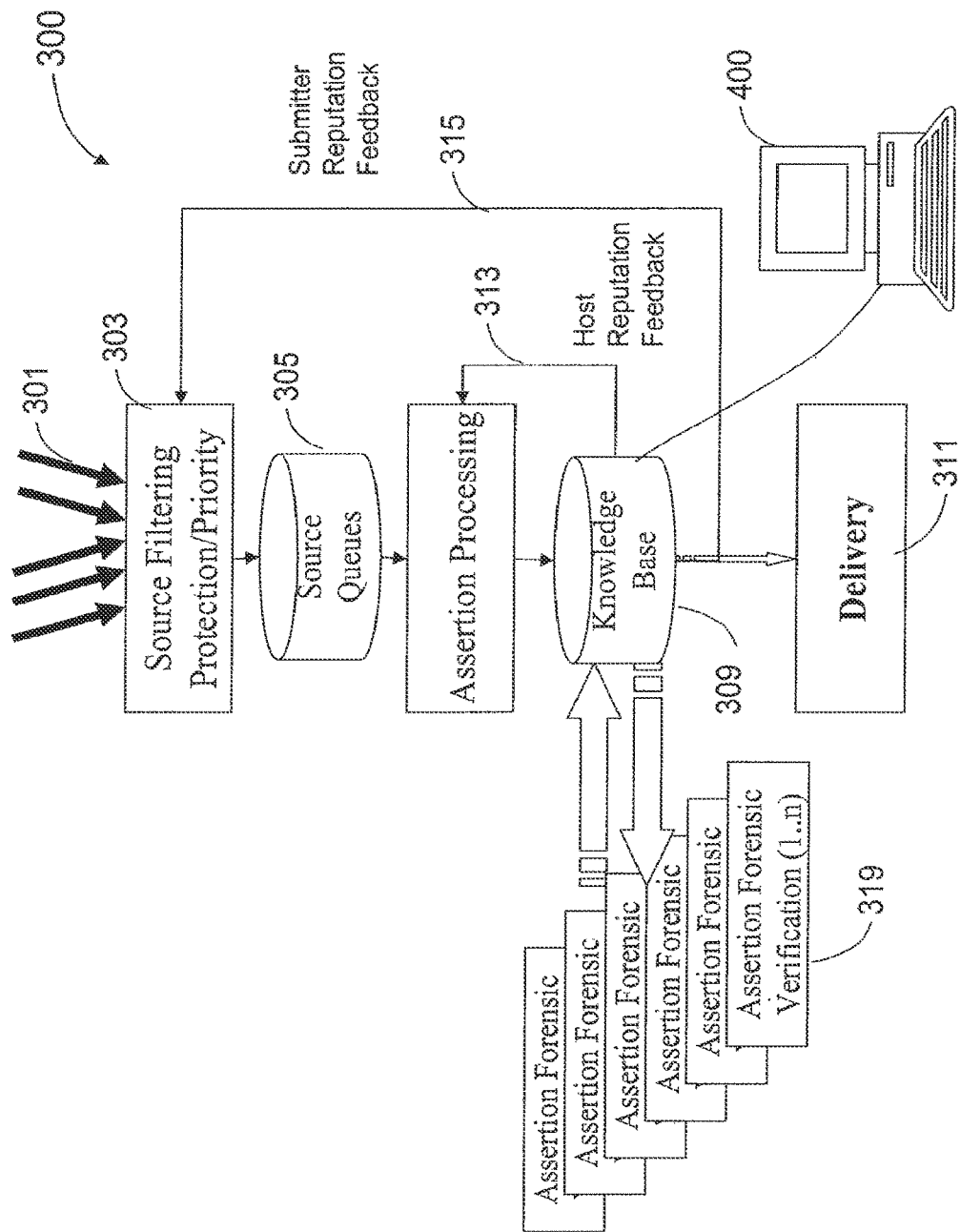
FIG. 3 is a more detailed diagram illustrating a knowledge base for storing node reputations according to an embodiment of the present invention.

FIG. 3 is a more detailed diagram 300 illustrating a knowledge base for storing node reputations according to an embodiment of the present invention. This diagram is merely an example, which should not unduly limit the scope of the claims herein. One of ordinary skill in the art would recognize other variations, modifications, and alternatives. As shown, the invention provides a method for creating a real time knowledge base of a plurality of nodes from a variety of submitters 301. Of course, there can be other variations, modifications, and alternatives.

In a specific embodiment, the method includes receiving first information about one or more nodes from a first submitter from a plurality of submitters numbered from 1 through N. In a specific embodiment, the method includes a source filtering protection/priority process, which can be used to process the first information, which may be subjected to feedback via loop 315. In a preferred embodiment, the one or more nodes are associated respectively with one or more IP addresses on a world-wide network of computers. In a specific embodiment, the method also includes source queues 305 and then an assertion process, step 307. Of course, there can be other variations, modifications, and alternatives.

In a specific embodiment, the method identifies a submitter reputation of the first submitter from a knowledge base 309. The submitter is one of the plurality of submitters numbered from 1 through N. In a preferred embodiment, the knowledge base has information associated with the first submitter, but in some embodiments information associated with the first submitter is initially populated. The knowledge base is subject to a host reputation feedback loop, step 313.

Depending upon the embodiment, there can be other variations, modifications, and alternatives.

The method includes associating a node reputation of the node based upon at least the reputation of the first submitter and first submitted information from the first submitter in a specific embodiment. The method also includes storing the first submitted information in a first portion of the knowledge base. The method also includes repeating the receiving, identifying, associating, and storing for second information from a second submitter. In a preferred embodiment, the steps can be repeated to populate the knowledge base, which is overseen by controller 400. In a specific embodiment, the knowledge base is also subjected to assertion forensic verification, step 319. In a specific embodiment, the information associated with any one of the submitters is transmitted to one or more security processes, step 311. Of course, there can be other variations, modifications, and alternatives.

Depending upon the specific embodiment, the system is overseen and controlled by one or more computer systems, including a microprocessor and/controllers. In a preferred embodiment, the computer system or systems include a common bus, oversees and performs operation and processing of information. The system also has a display, which can be a computer display, coupled to the control system 400, which will be described in more detail below. Of course, there can be other modifications, alternatives, and variations. Further details of the present system are provided throughout the specification and more particularly below.

Figure 4:
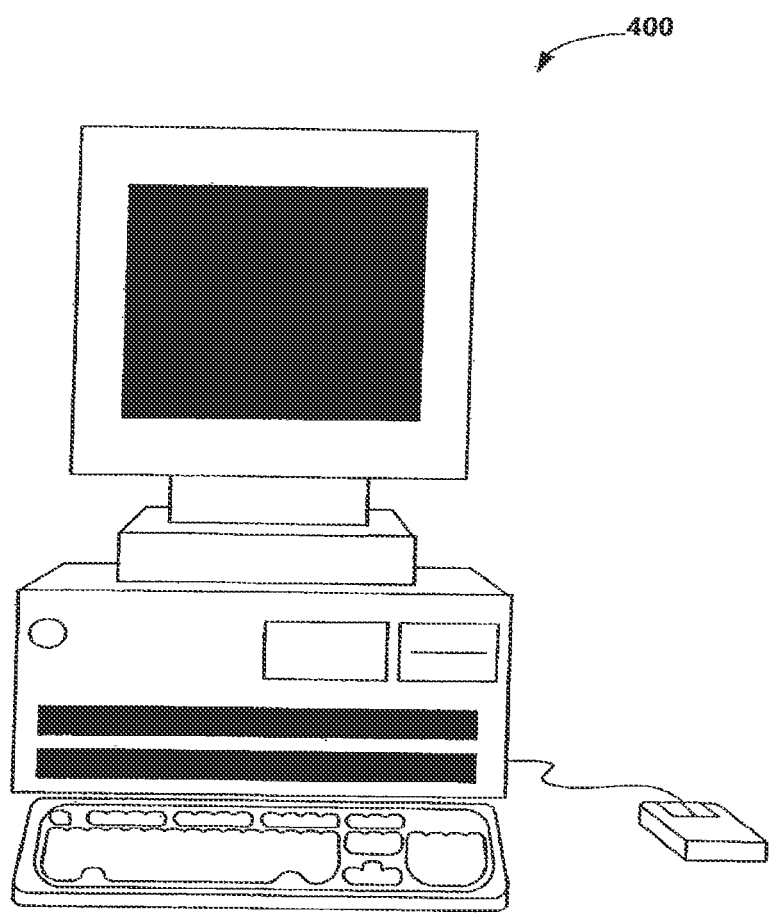
FIG. 4 is a simplified diagram of a computing system for the knowledge base of FIG. 3 according to an embodiment of the present invention.

FIG. 4 is a simplified diagram of a computing system 400 for the knowledge base of FIG. 3 according to an embodiment of the present invention. This diagram is merely an example, which should not unduly limit the scope of the claims herein. One of ordinary skill in the art would recognize other variations, modifications, and alternatives. As shown, the computer system includes display device, display screen, cabinet, keyboard, scanner and mouse. Mouse and keyboard are representative "user input devices." Mouse includes buttons for selection of buttons on a graphical user interface device. Other examples of user input devices are a touch screen, light pen, track ball, data glove, microphone, and so forth.

The system is merely representative of but one type of system for embodying the present invention. It will be readily apparent to one of ordinary skill in the art that many system types and configurations are suitable for use in conjunction with the present invention. In a preferred embodiment, computer system 400 includes a Pentium™ class based computer, running Windows™ NT operating system by Microsoft Corporation or Linux based systems from a variety of sources. However, the system is easily adapted to other operating systems and architectures by those of ordinary skill in the art without departing from the scope of the present invention. As noted, mouse can have one or more buttons such as buttons. Cabinet houses familiar computer components such as disk drives, a processor, storage device, etc. Storage devices include, but are not limited to, disk drives, magnetic tape, solid-state memory, flash memory, bubble memory, etc. Cabinet can include additional hardware such as input/output (I/O) interface cards for connecting computer system to external devices external storage, other computers or additional peripherals, which are further described below.

Figure 5:
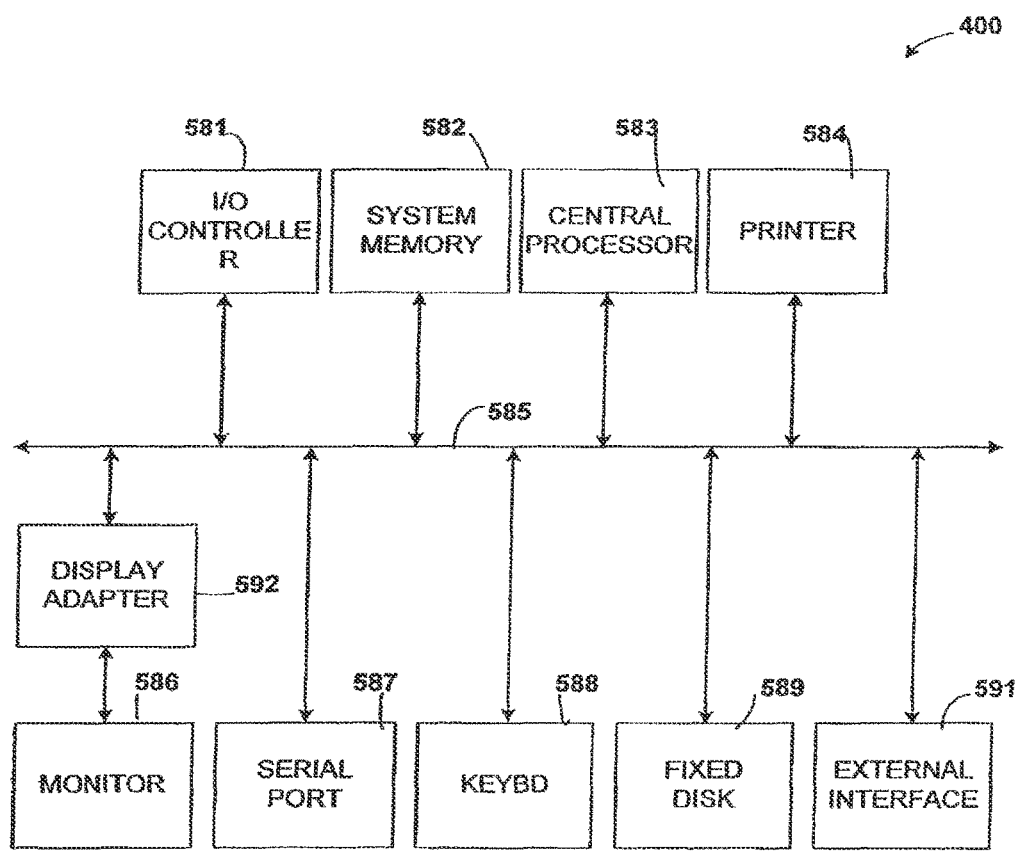
FIG. 5 is a block diagram of a computing system for the knowledge base of FIG. 3 according to an embodiment of the present invention.

FIG. 5 is a block diagram 500 of the computing system for the knowledge base of FIG. 3 according to an embodiment of the present invention. This diagram is merely an example, which should not unduly limit the scope of the claims herein. One of ordinary skill in the art would recognize other variations, modifications, and alternatives. As shown, basic subsystems are included in computer system 400. In specific embodiments, the subsystems are interconnected via a system bus 585. Additional subsystems such as a printer 584, keyboard 588, fixed disk 589, monitor 586, which is coupled to display adapter 592, and others are shown. Peripherals and input/output (I/O) devices, which couple to I/O controller 581, can be connected to the computer system by any number of means known in the art, such as serial port 587. For example, serial port 587 can be used to connect the computer system to a modem 591, which in turn connects to a wide area network such as the Internet, a mouse input device, or a scanner. The interconnection via system bus allows central processor 583 to communicate with each subsystem and to control the execution of instructions from system memory 582 or the fixed disk 589, as well as the exchange of information between subsystems. Other arrangements of subsystems and interconnections are readily achievable by those of ordinary skill in the art. System memory and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Although the above has been illustrated in terms of specific hardware features, it would be recognized that many variations, alternatives, and modifications can exist. For example, any of the hardware features can be further combined, or even separated. The features can also be implemented, in part, through software or a combination of hardware and software. The hardware and software can be further integrated or less integrated depending upon the application. Further details of certain methods according to the present invention can be found throughout the present specification and more particularly below.

Figure 6:
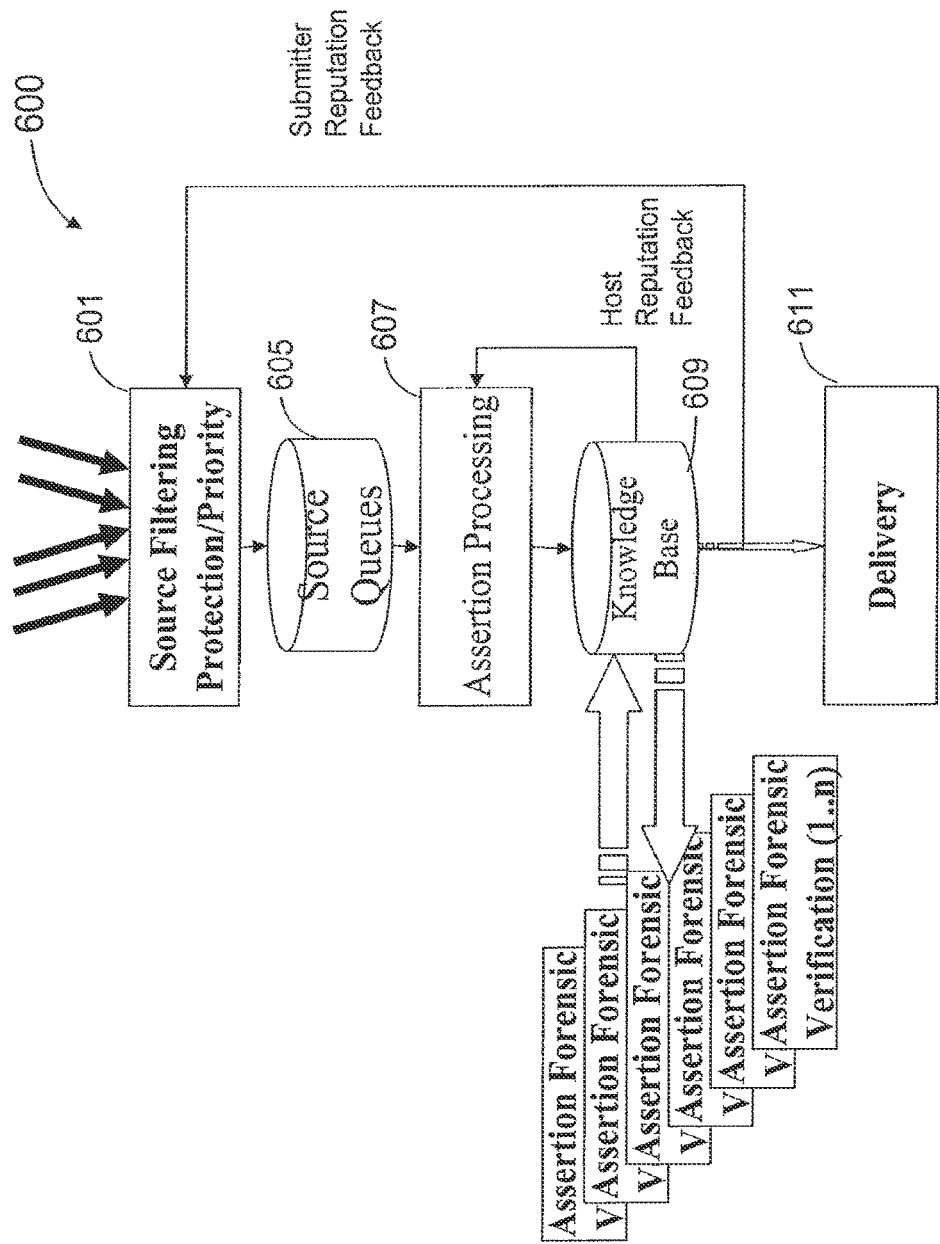
FIG. 6 is a more detailed diagram of system modules of the knowledge base according to an embodiment of the present invention.

FIG. 6 is a detailed diagram of system modules 600 of the knowledge base according to an embodiment of the present invention. This diagram is merely an example, which should not unduly limit the scope of the claims herein. One of ordinary skill in the art would recognize other variations, modifications, and alternatives. As shown, the system includes various modules including source filtering protection/priority module 601, source queues 605, assertion processing module 607, and a knowledge base 609. The knowledge base is coupled to controller, which has been previously described. The knowledge base is coupled to delivery module 611. Of course, there can be other variations, modifications, and alternatives.

Figure 7:
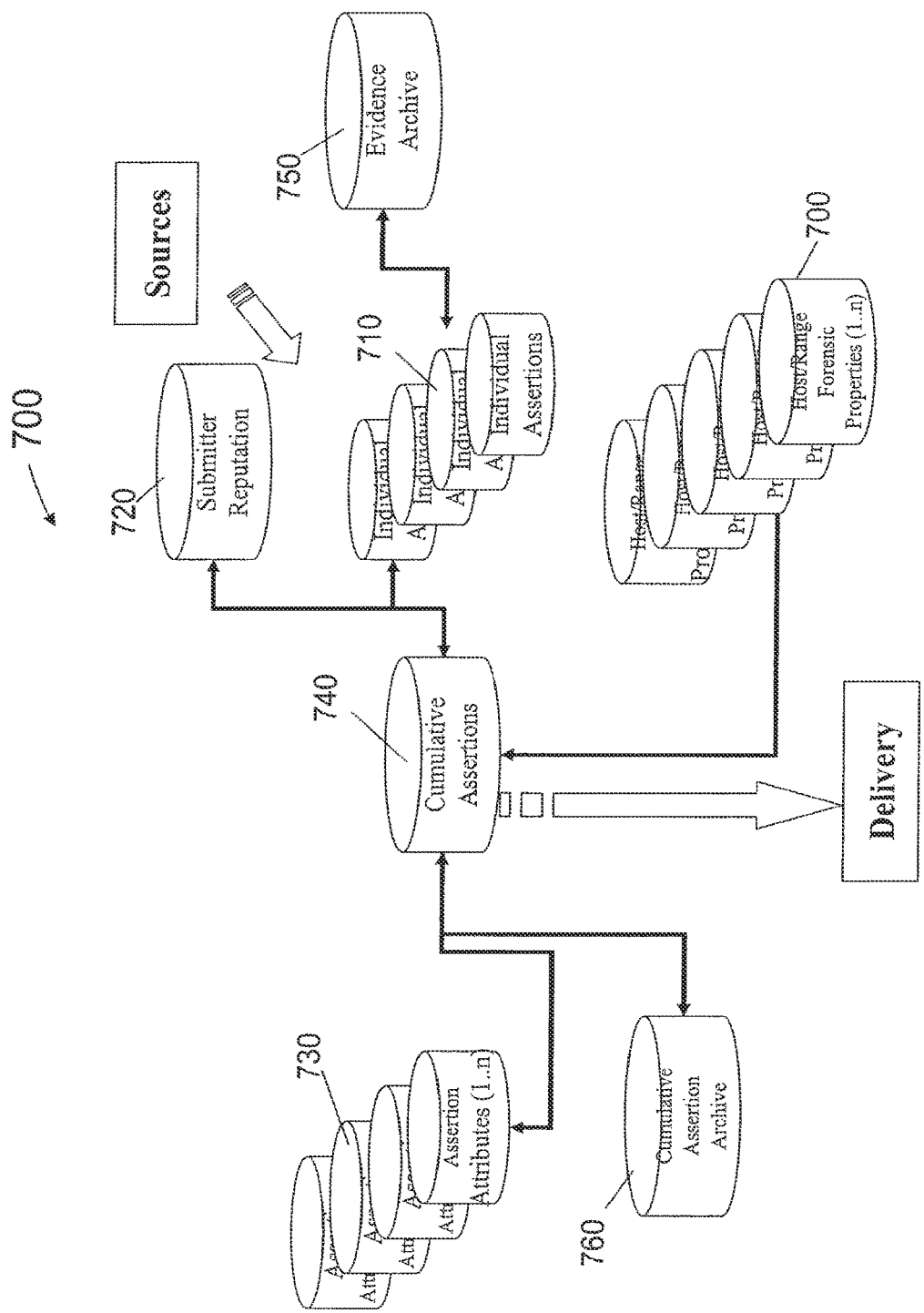
FIG. 7 is a simplified diagram of a data structure for a knowledge base according to an embodiment of the present invention.

FIG. 7 is a simplified diagram of a data structure 700 for a knowledge base according to an embodiment of the present invention. This diagram is merely an example, which should not unduly limit the scope of the claims herein. One of ordinary skill in the art would recognize other variations, modifications, and alternatives. As shown, knowledge base data structure 700 includes various data bases. In a specific embodiment, these data bases include database for individual assertions 710 made by submitter and database for submitter reputation 720. Data structure 700 also includes database for assertion attributes 730 and database for host/range properties. The cumulative assertion database 740 are linked to these data bases as well as archive databases such as for evidence archive database 750 and cumulative assertions database 760. Of course, depending upon the embodiments, there can be other variations, modifications, and alternatives. Further details of the present data structure can be found throughout the present specification and more particularly below.

To prove the operation of the present method and systems, we have provided these examples. These examples are merely illustrative and should not unduly limit the scope of the claims herein. One of ordinary skill in the art would recognize many variations, modifications, and alternatives. For easier reading, we have provided the headings below, which are not intended to be limiting in any manner.

Submission Methods

Submissions are received from across the network or Internet. These submissions are assertions or evidence of an actor's behavior. In a specific embodiment, the methods of submission include (but are not limited to):

- Clicking of a submission button or menu option in an email client to submit spam;
- Clicking of a submission button or menu option on an internet browser or other network enabled application to:
  - Submit spam or other evidence of an actor's behavior,
  - Assert positive or negative "voting/opinion" of an actor's behavior,
  - Assert positive or negative "voting/opinion" of an Internet resource (a URI or other), and
  - Upload Whitelist/override from user;
- Submission from automated background programs that submit evidence from log files or other historic recordings of an actor's behavior (Typical sources of such log files are firewalls, Intrusion Detection Systems, Antivirus Program, Web and Email Server, Instant Messaging or Chat servers.);
- Extraction from other information sources such as databases, lists and other services; and Relevant information that may be inferred or calculated from other information sources, inside or outside the system.

Figure 8:
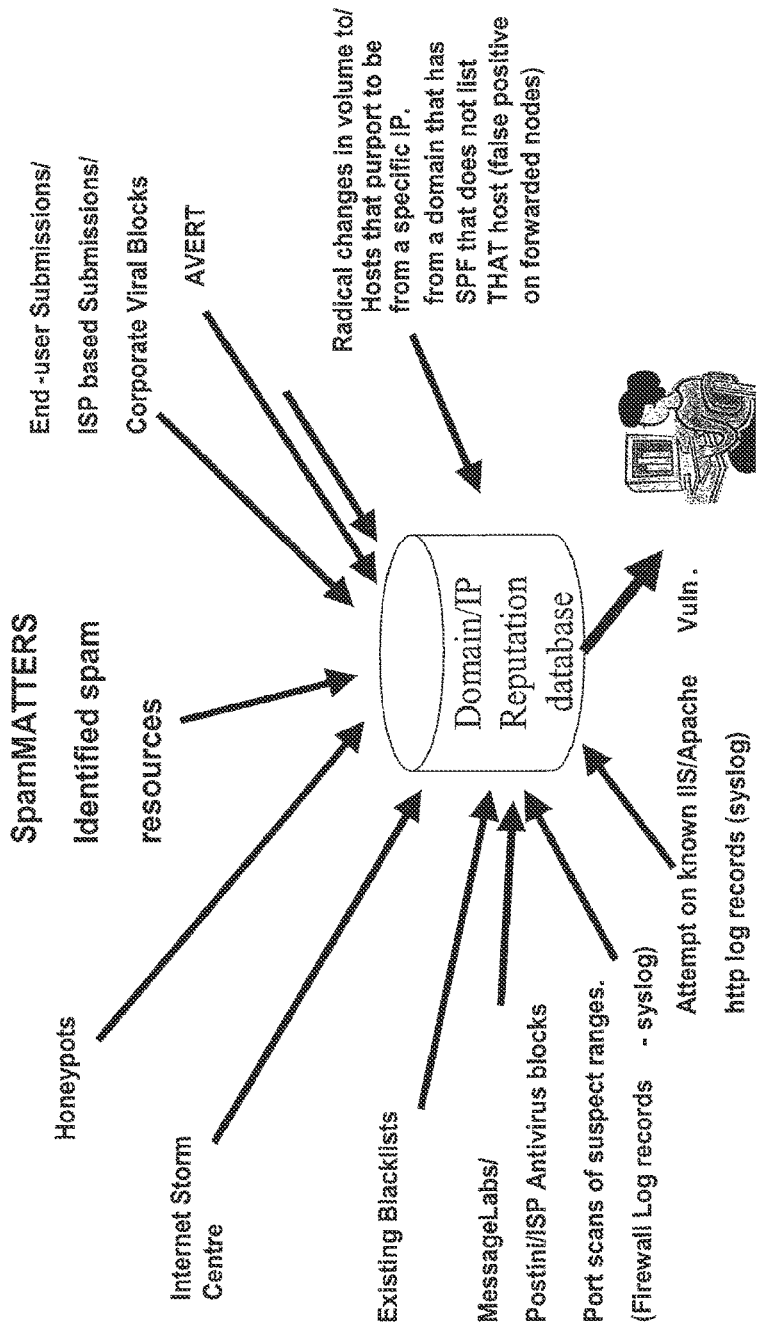
FIGS. 8 through 14 are simplified diagrams illustrating systems and methods according to embodiments of the present invention.

In an embodiment, transmission of evidence is performed in a manner that ensures the integrity of the evidence submitted and timely delivery of evidence. In a specific embodiment, FIG. 8 illustrates some of the sources of evidence and assertions that may potentially be accepted by the system for processing. This diagram is merely an example, which should not unduly limit the scope of the claims herein. One of ordinary skill in the art would recognize other variations, modifications, and alternatives.

Reputation Delivery Method

Figure 9:
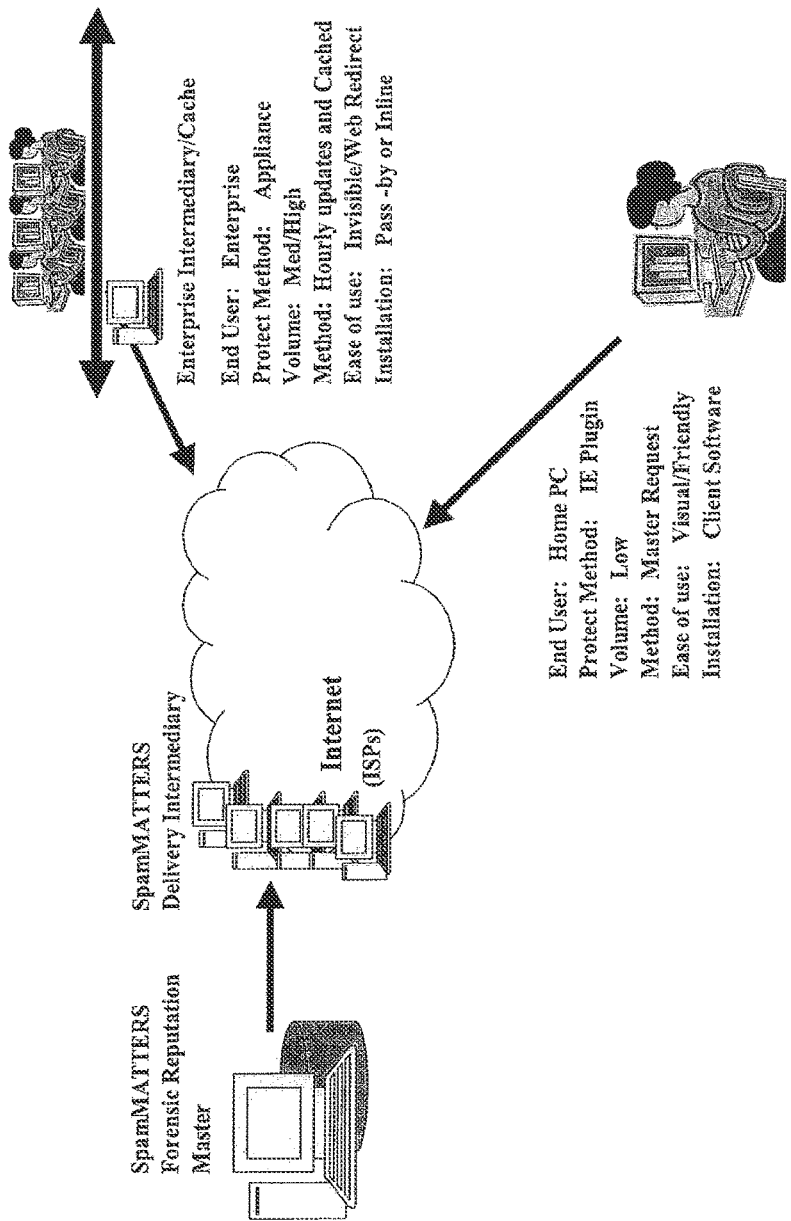

In a specific embodiment, the present system is able to provide responses to system users for requests about an actor's reputation. In a specific embodiment, the delivery of information is provided in a request/response cycle where a caching intermediary may fulfill the request at any point within the chain. In FIG. 9, as an example, we have illustrated "Delivery Hierarchy" of a general infrastructure in a typical Internet based deployment according to a specific embodiment. As another example, FIG. 10, which is labeled "User Request Flow," illustrates where requests are made by the end user or security application to the nearest cache/intermediary host. These diagrams are merely examples, which should not unduly limit the scope of the claims herein. One of ordinary skill in the art would recognize other variations, modifications, and alternatives.

Request

In a specific embodiment, a User or Security application may have a requirement to place a request. User or Security application ("Requester") forms a 'request' query based on:

The Actor address,
Protocol,
Selection criteria (such as URI),
Request type,
  Is this Actor safe?
  Is this Actor X really associated with Domain Y?
  More detailed information please (country/ISP/registered name etc).

In a specific embodiment, a request is transmitted over network connection to the configured intermediary.

Response

In a specific embodiment, an intermediary on the chain checks for information availability and, if so, sends the response back down the chain. For example, a response can include the following information.

Node rep on this protocol
Node rep on all protocols
Days/Hours/Minutes/Ticks since last report
Other specialized/specified response information In a specific embodiment, each intermediary returns the response until the Requester receives it. The Requester examines the response and acts according to the reputation information for the Actor. See Appendix A for detailed specification of Request/Response protocols.

In a specific embodiment, an example of Request/Response protocols has been provided. The example is given below in script language.

Request
- Request ::= <ReputationRequest> | <LicenseSessionRequest>| <DeepDetailRequest>
- <ReputationRequest> ::= <RequestType> + <Protocol> + <ActorAddress> + {<SelectionCriteria>}
  <RequestType> ::= Safe | ConfirmDomainAuthentic | DetailPlease
    Safe ~ Is this Actor safe?
    ConfirmDomainAuthentic ~ Is this Actor X really associated with Domain Y?
    DetailPlease - More detailed information please (country/ISP/registered name etc)
  <Protocol> ::= 1...65536
  <ActorAddress> ::= <dotnum>
  <dotnum> ::= <snum> "." <snum> "." <snum> "." <snum>
  <SelectionCriteria> (such as URI) ::= <string>
  <string> ::= <char> | <char> <string>
  <char> ::= <c> | "\" <x>
  <c> ::= any one of the 128 ASCII characters, but not any <special> or <SP>
  <x> ::= any one of the 128 ASCII characters (no exceptions)

Response
- Response ::= <ReputationResponse> | < LicenseSessionResponse>
- <ReputationResponse> ::= <RejectedResponse> | 1{<EncodedResponse>}n
  RejectedResponse ::= 0xFF "." 0xFF "." 0xFF "." <RejectReason>
  RejectReason ::= 3 '<'<6& 0..63 /* 0x11 left shifted 6 bits plus 6 bits */
  EncodedResponse ::= <ParameterisedDotnum>

```
ParameterisedDotnum ::= <Reserved-For-Future-Use-snum> "." <TimeLastReported-
snum> "." <AllProtocol-Rating-snum> "." <RequestedProtocol-Rating-snum>
Reserved-For-Future-Use-snum ::= 0
TimeLastReported-snum ::= 0-255 /* hours since last report */
AllProtocol-Rating-snum ::= <DispositionBits> & <ReservedBits> & <RatingBits>
DispositionBits ::= 0..3 '<'<6 /* left shift 6 bits */
    00 - GOOD
    01 - WARNING
    10 - BAD
    11 - RESERVED (guarantees no match with RejectedResponse)
ReservedBits ::= 0..4 '<'<4 /* left shift 4 bits */
RatingBits ::- 0..15 /* 4 bits */
```

Figure 11:
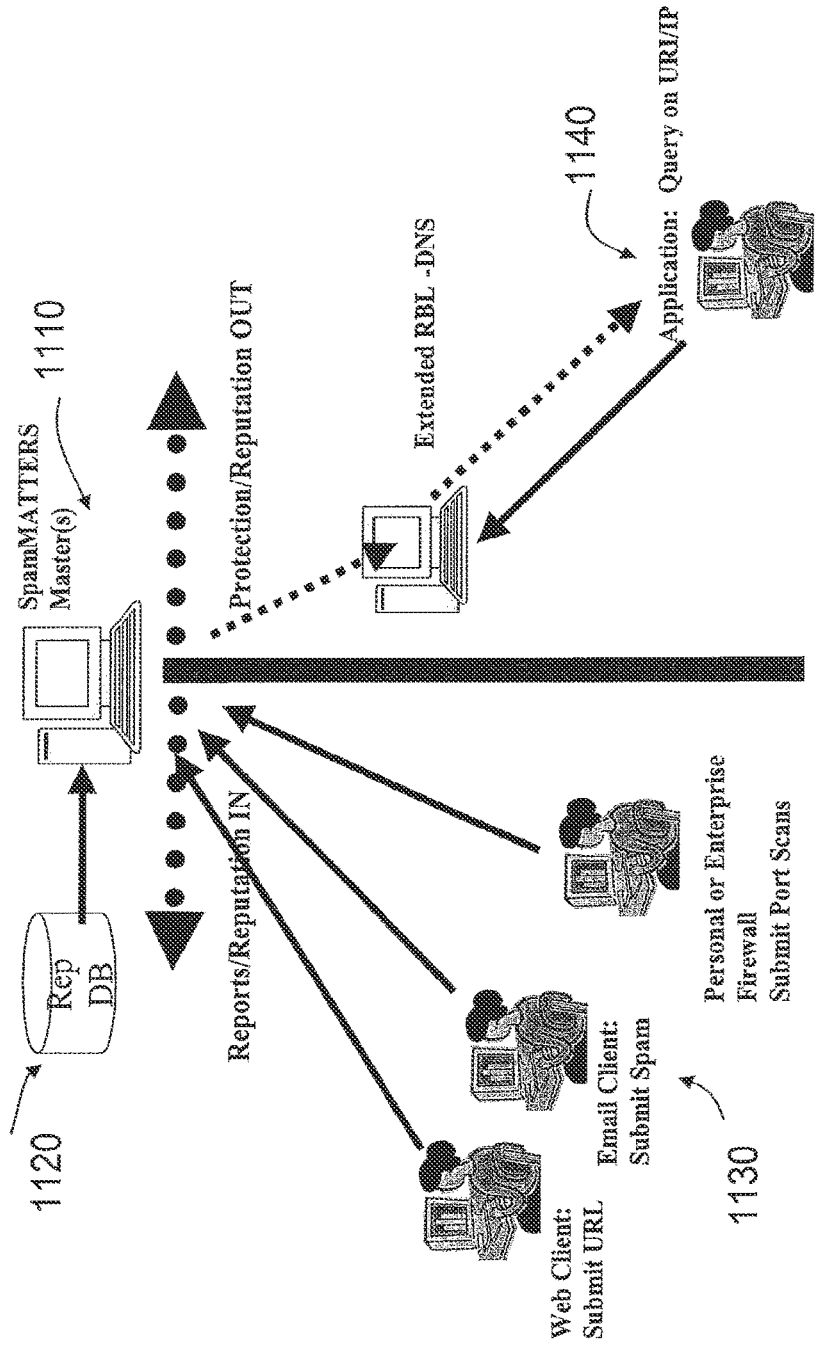

In a specific embodiment, the overall flow of information is represented by the FIG. 11, labeled "Logical Reputation Flow." This diagram is merely an example, which should not unduly limit the scope of the claims herein. One of ordinary skill in the art would recognize other variations, modifications, and alternatives. As shown, a computer based reputation system includes a computer 1110 and a reputation knowledge base 1120. In a specific embodiment, the system receives submissions from submitters 1130 and responds to requests made by requesters, such as 1140. Of course, depending upon the embodiments, there can be other variations, modifications, and alternatives. Further details of the present data structure can be found throughout the present specification and more particularly below.

Processing Method—Design

Details of a method for processing to obtain a Reputation for a given Actor are provided according to a specific embodiment. As a general rule, the reputation of an Actor can be expressed as a function of the following:

$$Reputation_{xc} = F(A, S, X, C)$$

Where
A—Assertions and Evidence
S—Submitters of Assertions and Evidence
X—The Actor
C—Context (of the reputation)

Assertions and Evidence relate to historical information about an Actor's (real or perceived) behavior and other attributes from the system analysis. This can be more explicitly stated as:

"The Reputation of Actor X in the Context C (for example connecting on port 25 to send email) can be determined by calculating the sum of all Assertions A from Submitters S with respect to Context C weighted by each S's reputation in the Context C."

The "Total Reputation" (Reputation$_x$) expands the evaluation to include weightings for the impact of each Context C. In an embodiment, some Contexts are considered more severe that others from a risk perspective. In a specific embodiment, the Total Reputation can be expressed as follows.

$$Reputation_{xc} = \frac{1}{mn} \sum_{\substack{s=0, \\ x=0, \\ c=C}}^{m,n,C} (A_{cxs} \times asserterweight_{cs})$$

$$Reputation_x = \frac{1}{p} \sum_{c=0}^{p} weight_c \times \left( \frac{1}{mn} \sum_{\substack{s=0, \\ x=0}}^{m,n} A_{cxs} \times asserterweight_{cs} \right)$$

Where:
p is the total number of Contexts for X
m is the total number of Submitter's submissions for a given X and C weight is system's constant of C's importance In a specific embodiment, Reputation can be expressed as a rational number (positive or negative) because assertions can be constrained to the domain of (−1, +1). The effect of $$\frac{1}{p} \text{ and } \frac{1}{mn}$$

is to normalize the result. Without normalization, a reputation can be distorted by malicious Submitters. For example, malicious submitters may seek to set arbitrarily large positive values to Bad or Related Actors, or large negative values or low positive values to Good Actors of an assertion "A" to alter the overall Reputation for a given Context C.

In an embodiment, the use of the terms Bad and Good relate to behaviors explicitly defined for a context C. For example, a Bad Actor in the context of Internet Email could typically be an actor that has sent spam or has some relationship with a spam operation. Other Bad attributes could be the sending of virus, phishing or other proof that the Actor is a compromised host. The term Related is found where a Submitter will be seeking to improve the Reputation of an Actor through a collaborative or collusive initiative. "A" can also optionally be normalized to regulate a Submitters' variations. This can occur if the submitter is deliberately attempting to highlight certain Actors as "Very Good" or "Very Bad". In an embodiment, a normalized assertion can be expressed in the following equation and further discussed below:

$$A_{sxc(norm)} = \frac{A_{sxc}}{\frac{1}{n} \sum_{i=0}^{i=n} A_{sic}}$$

Figure 12:
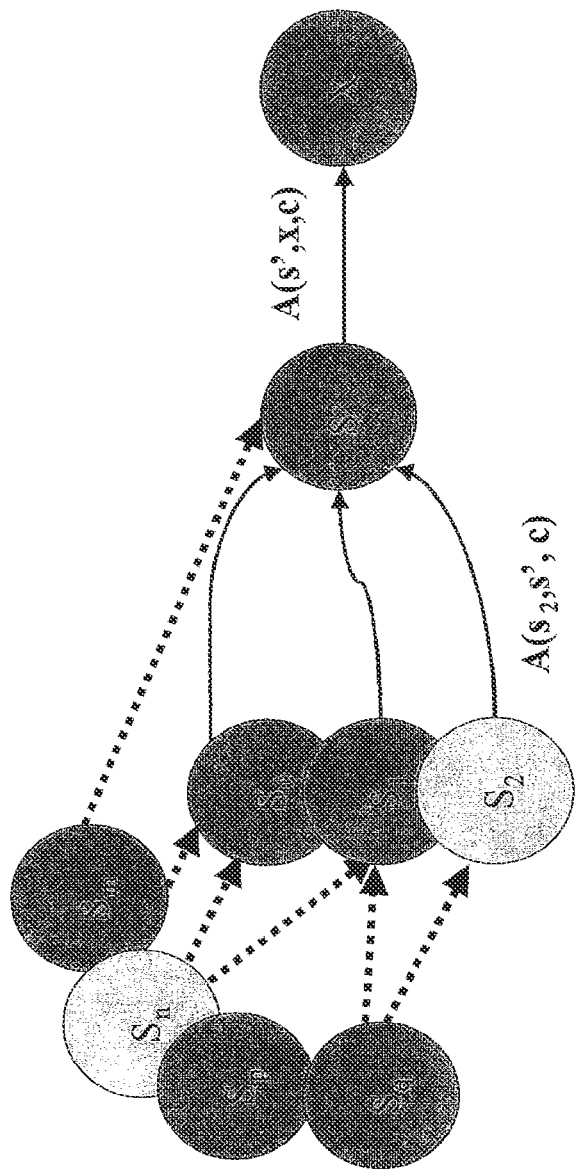

In a specific embodiment, the term "asserterweight" is derived from the reputation of each Submitter for the Context C. This is illustrated in FIG. 12 titled "Assertions within a Context". This diagram is merely an example, which should not unduly limit the scope of the claims herein. One of ordinary skill in the art would recognize other variations, modifications, and alternatives. As shown in FIG. 12, Submitters and Actors are linked by unidirectional chains of assertions. In FIG. 12 Actor X has a single Assertion A from Submitter S'. This is represented as A(s', x, c) for the given Context 'c'. The impact of S' assertion on X however, is regulated by the asserterweight for S' for the Context of 'c'. This is essentially the $Reputation_{s'c}$ resulting in inter-dependency of Submitters and Actors. Therefore:

$$asserterweight_{s'c} = Reputation_{s'c}$$

This relationship is discussed below in the section titled "Processing Method—Practical".

In a specific embodiment, the calculation of Reputation for any given node is an NP-Complete problem resembling the well-known "Traveling Salesman" problem. In an implementation where the numbers of Actors and Assertions are large, the cost of determining Reputation for any one Actor is excessive. In a specific embodiment, a method for reducing determination of Reputation is in the optimized selection of a starting point for the calculation of reputation. Selections of Submitters with the high positive reputation are made the starting point.

Figure 13:
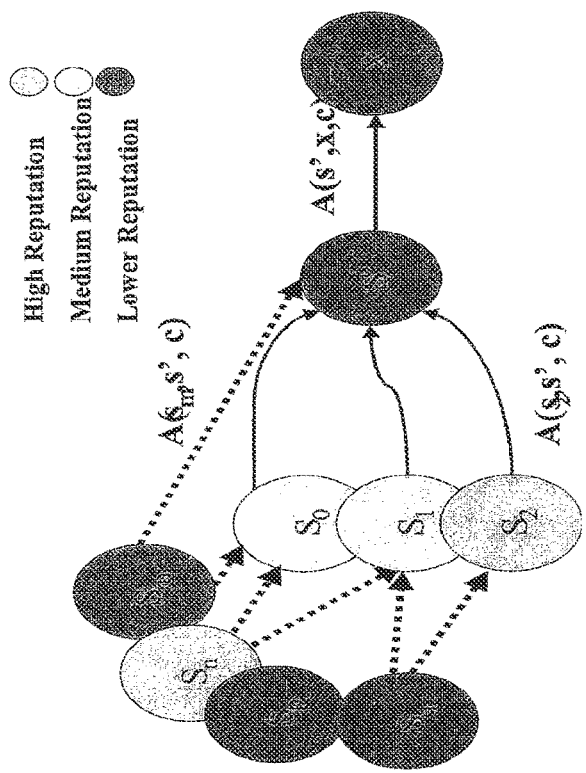
Figure 14:
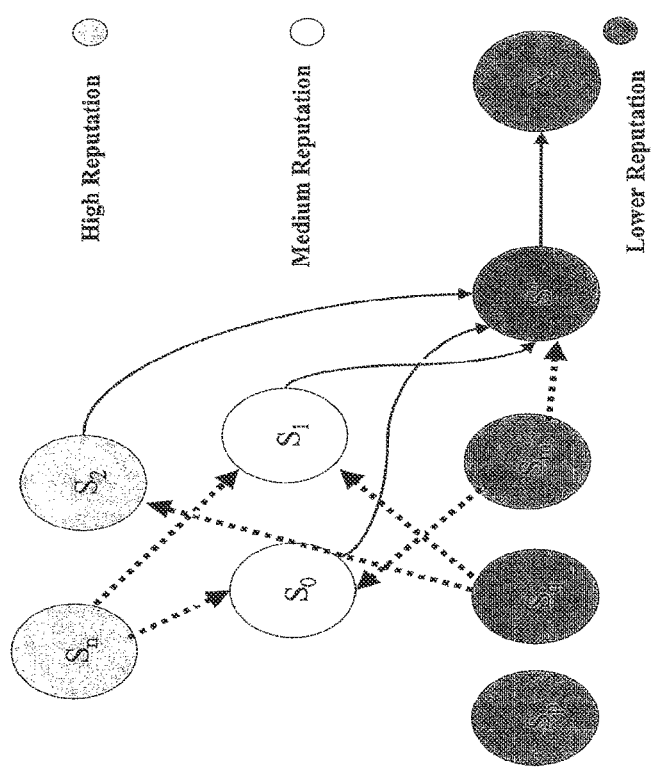

In FIG. 13 "Assertions within a Context II," the submitters are identified as having high positive reputation, slightly lower reputation, and the lowest reputation in this network, respectively. Therefore, in an embodiment, the Figure can be redrawn in a form of priority "Assertions within a Context III as shown in FIG. 14. In the FIG. 14 diagram, $S_p$ has not made any assertions, $S_q$ has made assertions about Actors $S_1$ and $S_2$ but the impact on reputation will have negligible effect because of its own low priority, and $S_2$ assertion on S' will have a large impact, etc.

Assertions by $S_0$ and $S_1$ will have a greater impact on S' reputation than the assertion by $S_m$ but will have less impact than $S_2$.

These diagrams are merely examples, which should not unduly limit the scope of the claims herein. One of ordinary skill in the art would recognize other variations, modifications, and alternatives.

In a specific embodiment, the solution for X in C can be expressed as follows:

$$Reputation_{cx} = A_{cxs'} \times asserterweight_{cs} \text{ or, alternatively expressed as:}$$
$$= A_{cxs'} \times reputation_{cs}$$

where $Reputation_{cs} =$ $$\frac{1}{4}(A_{cxs0} \times reputation_{cs0} + A_{cxs1} \times reputation_{cs1} + A_{cxs2} \times reputation_{cs2} + A_{cxs_m} \times reputation_{cs_m})$$

and where the reputation for $S_0$, $S_1$, $S_2$ and $S_m$ are calculated in an identical manner.

In a specific embodiment, a method is provided for incorporation of new Assertions. The method can be expressed as follows.

For each Assertion
  Select the next highest reputation Asserter
    Calculate Reputation for all peer and inferior Actors
    Continue.

Processing Method—Practical

This section describes one possible implementation of the method described above. The key attributes of the system are:
  Reputations (output values),
  Contexts (system defined attributes that allow examination of an Actor's behaviors),
  Submitters (registered and verifiable contributors of Assertions and Evidence to the system, and
  Actors, etc.

Of course, depending upon the embodiments, there can be other variations, modifications, and alternatives. Further details of the present method can be found throughout the present specification and more particularly below.

Contexts

A context is a defined criterion for an Actor's behavior. Some example contexts include, but are not limited to, the following:
  Spam-related Actor,
  Malicious Actor,
  Compromised Actor,
  Credible Actor,
  Content Specific Actor (reputation related to specific areas of expertise or information content), and
  Submission Actor (behaviors in Submitting to this system), etc.

In a specific embodiment, an Actor's Context-specific reputation is derived from assertions and evidence on a range of attributes. Examples of such attributes include, but are not limited to the following:
  Evidential, for example,
    Firewall Logs,
    IDS Logs,
    Web Server Logs,
    Mail Server Logs,
    Virus Submissions, and
    Spam Submissions, etc.
  Assertions, for example,
    Reporting of IP address,
    Voting of Web Content, and
    Certifications from independent authority, etc.
  Analysis, for example,
    IP range,
    Operating system Type and Version,
    TCP stack Type and Version,
    Exposed Network Applications Type and Version,
    Suspected/Proven Malware of Vulnerabilities present,
    Content of Website or related,
    Proximity to other malware events/activity, and
    Associated addresses
      Domains Registrar
      Name Servers,
      SPF or other records,
      TTLs, etc.

Submitters

In a specific embodiment, submitters register for access to be able to participate in providing evidence and assertions. In an embodiment, the system assumes that Submitters:
  Can lie (submissions are false or forged),
  Can have an agenda to manipulate reputation results (submissions are false or forged),
  Can make mistakes (false positives, configuration problems etc),
  Can be out of time synchronization,
  Can submit old information, and
  Can submit accurate information, etc.

In a specific embodiment, the Registration process ensures a high level of commitment to participation in the system. In an embodiment, a number of identification tasks are often completed that involve human involvement and cannot be automated. This can involve the following:
  Registering from a software program or website,
  Specifying an email address for registration information to be sent to, and
  Entering at least one pass-code that requires human translation from a graphical image.

In an embodiment, registration details are maintained by the system and all Submissions are accompanied with an "ID" and "Public Key" provided to the Submitter. This can prevent the forgery of submissions.

In a specific embodiment, registered submitters commence usage of the system with an initiating level of 'reputation' in the "Submission" Context. This reputation is determined and modified by the system over time according to the behaviors of the registered Submitter. For example a Submitter providing consistently accurate Assertions and Evidence will have increasing reputation in the "Submission" Context. This will increase the submitter's overall reputation, subject to neutral or good reputation in other Contexts.

Conversely, a Submitter with poor reputation can continue to submit Assertions and Evidence to the system, but will have reduced impact on the reputation of the target Actor. The previous statements "Submitters can lie" and "Submitters can have an agenda" are therefore addressed by this reputation in the Submission Context. Submitters that have excessively poor reputation may eventually be removed or disallowed from the system—evidence of behavior that resulted in poor reputation being stored in the system.

Actors

In a specific embodiment, actors are entities on a network, wide area network or Internet, where Assertion or Evidence is accepted. Actors do not need to register for the system and in many cases have no motive to register. In a specific embodiment, an Actor can be described as (but not limited to):

Host's unique location identifier (e.g. internet address),
Group of hosts (e.g. a range or subnet),
URI,
Unique identifier such as e-mail address,
Key or other identifier,
Submitter ID (from registering as a submitter in this system), and
Combination of one or more of the above, etc.

Reputation

Figure 10:
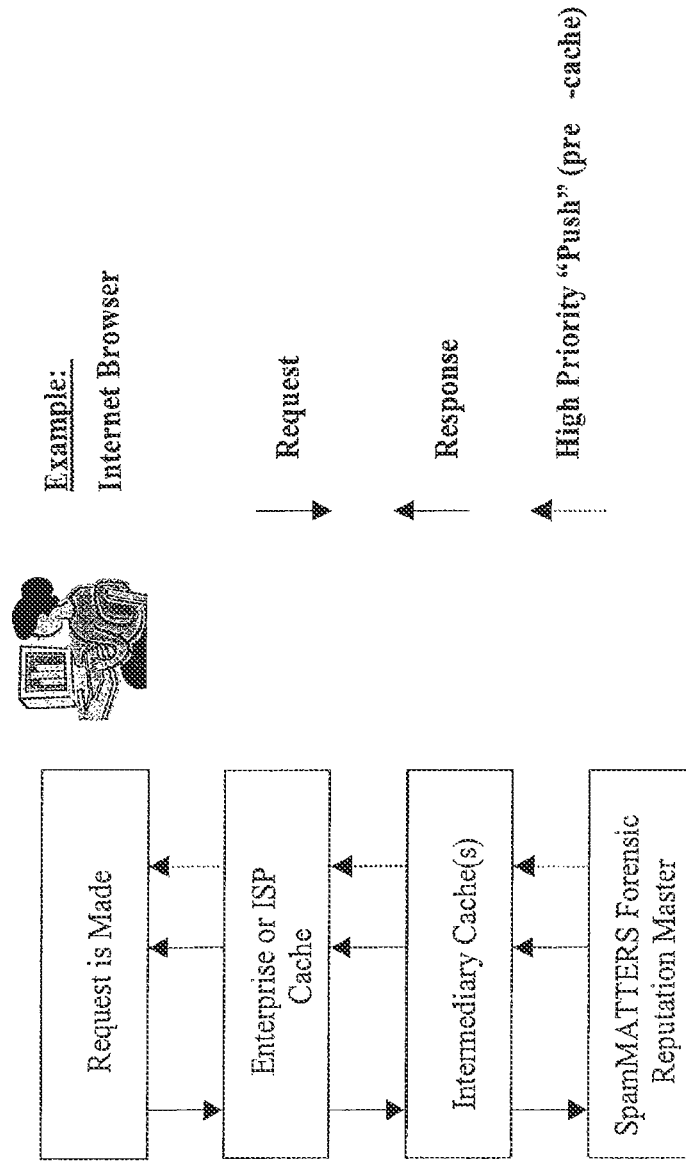

In a specific embodiment, reputation is a simple quantitative response to a request on a specific Actor. This allows a user or a security application to assess whether the Actor should be trusted for the current transaction. In an embodiment, a typical reputation response can include the following, as illustrated in FIG. 10 "User Request Flow."

Context Specific Reputation
  Context
  Actor
  Context Reputation
  Time since last reputation modification
  Time since last evidence or assertion
  Up or down reputation shift
Total Reputation
  Actor
  Total Reputation
  Time since last reputation modification
  Time since last evidence or assertion
  Up or down reputation shift.

In a specific embodiment, reputation responses are delivered based on the current reputation status for X and the requested C. As new Submissions are entered into the system, the reputation is updated either dynamically or in a scheduled operation by the method described in "Processing Method—design" discussed above.

In a specific embodiment, changes to reputation for Actors result in new data being available to reputation requestors (as illustrated in "Logical Reputation Flow"). Some typical changes can include the following:
  Actor Addition,
  Actor Deletion,
  Actor Reputation Change, and
  Actor Priority Reputation Change, etc.

According to a specific embodiment of the invention, an example of commercial deployment protocol is given below. StopBot is to be delivered as a commercial service; the value of the service is the completeness and currency of the information. Protection of the information from piracy is considered of high importance.

In a specific embodiment, the invention provides a commercially deployed solution which includes the following.
  1. Protection of databases
    Not allow a user to 'dictionary attack' the system in order to harvest the values. This must be distinguished from a high volume user;
    Rate limit and license limit the requests;
    Not allow the list to be reverse-engineered or decrypted (either in memory or on disk);
    Not allow the sniffing/parsing of any 'push' to intermediate devices.
  2. License enforcement
    Shall allow for licensing from single user to enterprise or ISP solutions;
    Allow for 'user pays' license stratification;
    User Pays is built on the following methodologies:
      1. License Disposition
        Session Requests per minute
        Session Requests per hour
          Specific Request Type limits are also possible (e.g an end user with a browser may have 100 ReputationRequests per hour and 10 DeepDetailRequest per hour.)
        Unrestricted
        Tracking of session usage is performed at the StopBot "Intermediary cache". This devolves license enforcement away from centralized resources.
      2. License Type
        Time Trial
          A time trial user can transition to a new user renew
          A time trial user can renew time trial after X days
        Usage Expiry Date
          A registered (paying user) will expire on a date
          The user can renew (out of band)
          The user can be advised 'there is X days to expiry' at a maximum of Y days in advance.
    Shall provide a clear indicator when user has exceeded license for current session.
    Shall allow for dynamic upgrading of license (not within protocols but allow for license to be increased).

According to an embodiment, the invention provides a mechanism for license enforcement, which includes the following.
  3. User Registers (via web or other sales processes) and is provided a License key via email. Effort in registration must be of sufficient difficulty to reduce "Sybil" attacks.
  4. User enters License key (once) into StopBot client system.

5. When the StopBot system initializes it establishes a session key with the StopBot "Intermediary cache" (IC):
6. The client sends the key to the IC (LicenseSessionRequest):
    i. The IC sends the key to StopBot master. The master checks for the currency and type of License.
    ii. The Master responds with the License type for the client.
    iii. The IC issues the session key to the client.
    iv. Each of these transmissions is SSL encrypted.
7. The IC to track session usage. The key can be invalidated at any time by the cache.
8. When session usage has exceeded or a 24 hour session key period has expired, all requests receive a response to establish a new session key.

According to another embodiment of the invention, a method is provided for sizing a system for processing a stream of information from a computer network using node based reputation characteristics. This discussion below does not address Ipv6, which is reserved for later, as most malicious hosts are residing in Ipv4 space. In a specific embodiment of the present invention, the size of an IPv4 address space is $2^{32}$' giving a potential 4.3 billion hosts. In practice the actual space can be smaller or larger. It can be smaller because the allocation is provided in chunks, whereas it can be larger because a single address may represent many NATed hosts. Organizations are allocated CIDR blocks of addresses. For example, a/24 block is 32−24=8 bits of unique addresses. That is 256 IP hosts. A/20 block is 32−20=12 bits of unique addresses. That is 4096 IP hosts. An organization such as bigpond would be allocated several large blocks (and probably zillions of small ones).

In a specific embodiment of the present invention, our ISP's allocation to us looks like this:

```
C:\lunoan\perl>perl iana_test.pm 203.111.165.210
Country: AU
Netname: NTTIP-AU
Descr: NTT Australia IP Pty Ltd209 Castlereagh StSydney NSW 2000
Status: ALLOCATED PORTABLE
Source: APNIC
Server: APNIC
Inetnum: 203.111.128.0 - 203.111.191.255
```

This is the code for this report:

```
use Net::Whois::IANA;
    my $ip = shift;
    my $iana = new Net::Whois::IANA;
    $iana->whois_query(-ip=>$ip);
    print "Country: " . $iana->country( ) . "\n";;
    print "Netname: " . $iana->netname( ) . "\n";;
    print "Descr: " . $iana->descr( ) . "\n";;
    print "Status: " . $iana->status( ) . "\n";;
    print "Source: " . $iana->source( ) . "\n";;
    print "Server: " . $iana->server( ) . "\n";;
    print "Inetnum: " . $iana->inetnum( ) . "\n";;
```

So this is summarized as 203.111.128/18 giving a total number of 32−18=14 bits which can represent 16384 hosts. Its also interesting to note that the next contiguous segment does not below to NTT:

```
C:\lunoan\perl>perl iana_test.pm 203.111.192.000
Country: SG
```

-continued

```
Netname: LYAS
Descr: LYCOS ASIAREGIONAL NETWORKASIA PASIFIC
Status: ALLOCATED PORTABLE
Source: APNIC
Server: APNIC
Inetnum: 203.111.192.0 - 203.111.207.255
```

Summarized as 203.111.192/20 giving 4096 hosts

According to a specific embodiment of the invention, a method for processing information from a variety of submitters can be briefly outlined as below.
1. Receive information about one or more nodes from a submitter from a plurality of submitters numbered from 1 through N;
2. Identify a submitter reputation of the submitter from a knowledge base;
3. Associate a node reputation of the node based upon at least the reputation of the submitter and submitted information from the submitter; and
4. Transfer the node reputation.

In a specific embodiment, the one or more nodes are associated respectively with one or more IP addresses on a world wide network of computers. In an embodiment, the submitter is selected from a firewall log, a client, a spam trap, another spam or virus filter server, or other source. In some embodiments, the method includes assigning a policy to the node based upon at least the node reputation. In other embodiments, the method stores the submitter reputation in the knowledge base as legal evidence. In another embodiment, the method receives information about one or more nodes from another submitter.

The above sequence of steps provides a method according to an embodiment of the present invention. In a specific embodiment, the present invention provides a method for processing information from a variety of submitters. Other alternatives can also be provided where steps are added, one or more steps are removed, or one or more steps are provided in a different sequence without departing from the scope of the claims herein. Details of the present method and structure can be found throughout the present specification and more particularly below.

According to another specific embodiment of the invention, a method for processing a stream of information to determine a security level can be briefly outlined as below.
1. Provide a knowledge base, the knowledge base having information about a plurality of nodes, each of the nodes numbered from 1 through N;
2. Identify a selected node from the plurality of nodes, the selected node being coupled to a network of computers;
3. Request reputation information associated with the selected node through the network of computers;
4. Derive at least one of the reputation characteristics numbered from 1 through N of the selected node from the knowledge base;
5. Transfer the reputation characteristic through the network of computers; and
6. Process information from a stream of data associated with the selected node within the plurality of nodes using a selection of at least one of a plurality of processes.

In a specific embodiment of the method, each of the nodes being assigned a reputation characteristic is numbered respectively from 1 through N. In en embodiment, each of the reputation characteristics includes one or more of a plurality of properties. In an embodiment, the one or more properties include one or more evidence elements. In another embodiment, the one or more properties include one or more assertions. For example, the one or more plurality of properties can be selected from a country of origin, an attribute, a use characteristic or an action. As another example, the one or more plurality of properties is selected from an ISP name, host operating system, host behavior when contacting another host, host association with another malicious host, volume of traffic from a host or a result of a scan of a host. In an embodiment, the processing of information from a stream of data selects processes that are associated with the reputation characteristic of the selected node. In some embodiments, the one of the plurality of processes is selected from do nothing, drop connect, redirect information, delay information or tar pit information. In an embodiment, the processing is provided by a firewall process, an intrusion detection process or a filtering process. In various embodiments, the knowledge base comprises a data base. In some embodiments, the knowledge base is coupled to the network of computers.

The above sequence of steps provides a method according to an embodiment of the present invention. In a specific embodiment, the present invention provides a method for processing a stream of information to determine a security level. Other alternatives can also be provided where steps are added, one or more steps are removed, or one or more steps are provided in a different sequence without departing from the scope of the claims herein. Details of the present method and structure can be found throughout the present specification.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method, implemented in a computer system that includes at least one processor and at least one storage device, for determining a reputation of a node in a context using information received electronically from a plurality of submitters, the method comprising:
   receiving, using the at least one processor, first information about one or more nodes from a first submitter of the plurality of submitters and second information about one or more nodes from a second submitter of the plurality of submitters, the one or more nodes being associated with a network;
   identifying, using the at least one processor, a first reputation of the first submitter in the context and a second reputation of the second submitter in the context from a knowledge base,
   wherein a reputation of a submitter in a given context is based at least on assertions associated with past behavior of the submitter in the given context and attributes from each of the other submitters of the plurality of submitters, each assertion from each submitter of the other submitters of the plurality of submitters weighted by a reputation of the submitter in the given context;
   calculating, using the at least one processor, a node reputation of the node in the context based upon at least the first reputation of the first submitter in the context and the first information received from the first submitter and the second reputation of the second submitter in the context and the second information received from the second submitter,
   wherein the node reputation of the node in a context is determined by calculating a sum of assertions from the submitter with respect to the context weighted by each submitter's reputation in the context, wherein the node reputation is expressed as a rational number based on normalized assertions, wherein a normalized assertion is expressed as:

$$A_{sxc(norm)} = \frac{A_{sxc}}{\frac{1}{n}\sum_{i=0}^{i=n} A_{sic}}$$

where A denotes an assertion, $A_{sxc}$ is an assertion submitted by a submitter S in a context C about node X, and $A_{sic}$ is an assertion submitted by submitter S about node i, i=1 to n, and n is an integer;
   transferring, using the at least one processor, the node reputation to a user of the computer system, and
   developing and/or updating a knowledgebase intrusion detection system by applying the calculated node reputation.

2. The method of claim 1 wherein the first submitter and the second submitter are each one of a firewall log, a client device, a spam trap, a spam filter server, or a virus filter server.

3. The method of claim 1 further comprising assigning a policy to the node based upon at least the node reputation.

4. The method of claim 1 further comprising storing a reputation of a submitter in the knowledge base as legal evidence.

5. The method of claim 1 further comprising receiving information about the one or more nodes from another submitter of the plurality of submitters, the another submitter being distinct from the first submitter and the second submitter, and wherein the first submitter and second submitters are distinct from the one or more nodes.

6. The method of claim 1, wherein each of the context and the given context is one of Internet email, website content, reporting of Internet Protocol (IP) address, or voting of web content.

7. A system for determining a reputation of an actor associated with a network using information received electronically from a plurality of submitters, the system comprising:
   a processor;
   a non-transitory storage medium; and
   computer code stored in said non-transitory storage medium, wherein said computer code, when retrieved from said storage medium and executed by said processor, results in:
   receiving information about the actor from a submitter of the plurality of submitters;
   identifying a reputation of the submitter in the context from a knowledge base,
   wherein the reputation of the submitter is associated with past behavior of the submitter and is determined at least by assertions from one or more submitters from a second plurality of submitters weighted by reputations of the one or more submitters;
   calculating a reputation of the actor in the context by based upon at least the reputation of the submitter in the context and the information received from the submitter in the context, wherein the reputation of the actor in the context is determined at least by assertions regarding past behaviors of the actor in the context from the submitter weighted by the reputation of the submitter in the context;

transferring to a user of the system the reputation of the actor in the context, wherein the reputation of the submitter in a context is determined by calculating a sum of assertions from the one or more submitters with respect to the context weighted by each submitter's reputation in the context, wherein the reputation of the actor is expressed as a rational number based on normalized assertions, wherein a normalized assertion is expressed as:

$$A_{sxc(norm)} = \frac{A_{sxc}}{\frac{1}{n}\sum_{i=0}^{i=n} A_{sic}}$$

where A denotes an assertion, $A_{sxc}$, is an assertion submitted by a submitter S in a context C about node X, and $A_{sic}$ is an assertion submitted by submitter S about node i, i=1 to n, and n is an integer, and developing and/or updating a knowledgebase intrusion detection system by applying the calculated node reputation.

8. The system of claim 7 wherein the actor comprises one of an internet node or an entity controlling the behavior of a network node.

9. The system of claim 8 wherein the entity comprises a human user or an automated computer program.

10. The system of claim 7 wherein the actor comprises one of:
a combination of an internet node and an entity controlling the internet node either directly or remotely, or
a combination of an internet node and an entity controlling the internet node, the actor being configured to operate through a proxy.

11. The system of claim 7 wherein the actor is associated with one or more of the following identifiers: an email address of a user, an attribute, a device identifier (ID) of a network node, an Internet service provider (ISP) name, a country of origin, an Internet protocol address, a host operating system, and a host identification number.

12. The system of claim 7 wherein the information about the actor comprises information about fraudulent behaviors performed by the actor.

13. The system of claim 7 further comprising one or more codes directed to processing at least the reputation of the submitter and information received from the submitter by a firewall process, an intrusion detection process, or a filtering process, wherein the reputation of the actor associates the actor with fraudulent behaviors.

14. The method of claim 7, wherein the context is one of Internet email, website content, reporting of Internet Protocol (IP) address, or voting of web content.

15. A non-transitory computer-readable medium storing instructions that, when executed by one or more processors of a system, cause the one or more processors to perform a set of steps comprising:

receiving information about one or more nodes from a plurality of submitters, the one or more nodes being associated with a network;

identifying, using the at least one processor, a reputation of each submitter of the plurality of submitters from a knowledge base, wherein the reputation of the submitter is associated with past behavior of the submitter;

calculating, using the at least one processor, a node reputation of a node of the one or more nodes, wherein the node reputation of the node in a context is determined according to the equations:

$$\text{Reputation}_{xc} = \frac{1}{mn}\sum_{\substack{s=0 \\ x=0 \\ c=0}}^{m,n,C} (A_{cxs} \times asserterweight_{cs})$$

$$\text{Reputation}_x = \frac{1}{p}\sum_{c=0}^{p} weight_c \times \left(\frac{1}{mn}\sum_{\substack{s=0 \\ x=0}}^{m,n} A_{cxs} \times asserterweight_{cs}\right)$$

where:
Reputation$_{xc}$ is a reputation of node X in context C,
Reputation$_x$ is a reputation of node X weighted over context C, C=0 to p,
weight$_c$ is a weight associated with context C,
$A_{cxs}$ is an assertion submitted by a submitter S in a context C about node X,
asserterweight$_{cs}$ is an assertion weighted by a submitter's reputation,
p is a total number of Contexts for node X,
m is a total number of Submitter's submissions for a given node X and context C,
n is a total number of nodes, n is an integer greater than 1, and
weight is a System's constant of C's importance;
transferring the node reputation to a user of a computer the system, and
developing and/or updating a knowledgebase intrusion detection system by applying the calculated node reputation.

16. The non-transitory computer-readable medium of claim 15, further comprising receiving a request for submitter reputation information and transferring the submitter reputation information over a network.

17. The non-transitory computer-readable medium of claim 15, wherein the information is received via one of a push process or a pull process.

18. The non-transitory computer-readable medium of claim 15, wherein the node reputation comprises at least a score, the score being a measure of historic behavior.

19. The non-transitory computer-readable medium of claim 15 further comprising determining one or more zones, each of the zones representing one or more of the nodes, each of the zones being associated with a unique set of reputations.

20. The non-transitory computer-readable medium of claim 15, wherein each context of the plurality of contexts is one of Internet email, website content, reporting of Internet Protocol (IP) address, or voting of web content.

* * * * *